United States Patent [19]

Riddick et al.

[11] Patent Number: 5,008,338
[45] Date of Patent: Apr. 16, 1991

[54] HYDROXYETHERS OF EPOXIDIZED POLYBUTENES

[75] Inventors: Wayne T. Riddick, Oak Park; Vincent F. Smith, Jr., Big Rock, both of Ill.

[73] Assignee: Amoco Corporation, Chicago, Ill.

[21] Appl. No.: 304,766

[22] Filed: Jan. 31, 1989

[51] Int. Cl.$^5$ .............................................. C08F 8/00
[52] U.S. Cl. .................................... 525/177; 525/223; 525/328.8; 525/330.3; 525/333.7; 525/384; 525/445; 528/405; 560/198; 560/205; 568/678; 568/679; 568/680
[58] Field of Search ............ 525/177, 208, 223, 327.3, 525/327.9, 384, 328.8, 330.3, 333.7, 445; 528/405, 406; 568/678, 679, 680; 560/198, 205; 549/525

[56] References Cited

U.S. PATENT DOCUMENTS 2,833,747  5/1958  Greenspan ........................ 549/525
2,914,490 11/1959  Wheelock ......................... 549/512
3,382,255  5/1968  White ............................. 549/525
3,842,010 10/1974  Pappas ............................ 525/382

FOREIGN PATENT DOCUMENTS 013218  6/1968  Japan .
1170319 11/1969  United Kingdom .

Primary Examiner—John C. Bleutge
Assistant Examiner—David Buttner
Attorney, Agent, or Firm—Gunar J. Blumberg; William H. Magidson; Ralph C. Medhurst

[57] ABSTRACT

A process is disclosed for preparing hydroxyethers of epoxidized polybutenes wherein the epoxide groups of said epoxidized polybutenes are about 70% trisubstituted and about 20% tetrasubstituted. Hydroxyl compounds are reacted with epoxidized polybutenes to obtain compounds of increased flexibility, water resistance, lubricity, and adhesion as compared with said hydroxyl compounds.

6 Claims, No Drawings

HYDROXYETHERS OF EPOXIDIZED POLYBUTENES

FIELD OF THE INVENTION

This invention relates to hydroxyethers of epoxidized polybutenes and to a method for their preparation. Epoxidized polybutenes have been typically found to be unreactive and previous attempts to prepare hydroxyethers of these epoxidized polybutenes have been unsuccessful. More particularly, the present invention relates to hydroxyethers of epoxidized polybutenes wherein the polybutenes have been prepared in the presence of an aluminum chloride catalyst wherein the resulting polybutene has one double bond per chain and the percentage of vinylidene 1,1-disubstituted radicals present is about 10% of the total unsaturated radicals present. The unsaturated radicals comprise about 70% trisubstituted double bonds and about 20% tetrasubstituted double bonds. On epoxidation, the resulting epoxidized polybutene accordingly is relatively unreactive due to steric hindrance as compared with the reactivity of epoxidized polybutenes prepared from polybutenes prepared with other catalysts. Hydroxyethers of epoxidized polybutenes are useful as chemical intermediates for modification of materials such as polyesters, acrylics, epoxies, and polyurethanes. Such modifications can be desirable for applications such as coatings, sealants, and foams, where properties of adhesion, flexibility, water resistance or lubricity are of importance. Hydroxyethers of epoxidized polybutenes, including hydroxyethers formed on direct reaction between epoxidized polybutenes and hydroxyl functional polymers, are also useful without further chemical modifications, for applications such as surfactants, and for applications where the hydroxyether is physically blended with other materials.

BACKGROUND OF THE INVENTION

The production of isobutylene polymers from mixed $C_4$ hydrocarbon feedstreams is generally known in the art. Typically, the reaction uses strong Lewis acids, i.e., titanium tetrachloride, aluminum trichloride, boron trifluoride. The resulting polyisobutylene has only one functional terminal double bond. It is often preferred to utilize $AlCl_3$ as the polymerization catalyst in such processes and the prior art discloses a number of co-catalyst or catalyst promoters, including hydrogen chloride, for use under various conditions in isobutylene polymerization.

Representative disclosures include U.S. Pat. No. 2,957,930, which shows the use of 10 to 20% $AlCl_3$ catalyst in the production of polyisobutylene from a $C_1-C_5$ petroleum gas feedstock with 0.08 to 0.12 percent HCl, relative to $AlCl_3$, used as a catalyst promoter. This reference notes that correspondingly small quantities of water vapor or chloroform, which can react with $AlCl_3$ to release HCl, may also be used. British Pat. No. 1,195,760 (1970) discloses the production of olefin polymers by polymerization in the presence of the catalyst comprising a liquid complex of $AlCl_3$, HCl and an alkyl benzene. Polymerization products include materials other than polyisobutylene and products with a narrow molecular weight distribution are disclosed in this reference.

U.S. Pat. Nos. 3,200,169 and 3,200,170 deal with reaction mixture separation methods after polymerization of propylene or butylene feeds utilizing an ammonia treatment process. HCl is disclosed in the references as a suitable catalyst promoter added to the reaction zone which contains an $AlCl_3$ catalyst.

U.S. Pat. No. 3,997,129 discloses polybutenes from a $C_1-C_5$ liquified refinery stream wherein the catalyst is solid particles of $AlCl_3$ promoted with HCl qas or its equivalent. This process employs a static mixer for mixing catalysts and feed prior to conductinq polymerization.

U.S. Pat. No. 3,985,822 relates to the production of poly-n-butenes by use of $AlCl_3$ promoted with HCl but the objective is to reduce the isobutylene content of the polymer product.

U.S. Pat. No. 3,119,884 discloses a series of vertical column reactors useful for polymerizing isobutylene and further discloses a catalyst system comprising $AlCl_3$ and HCl or a substance which generates HCl. The catalyst system is described as an acid promoted $AlCl_3$ catalyst. In such a system, a reaction between HCl and $AlCl_3$ occurs to form $H^+AlCl_4^-$ which is the species that initiates polymerization. According to this process, one method of introducing catalysts and reactants is to have the three materials, i.e. $AlCl_3$ HCl and liquid feed, enter the reactor through the same duct.

It is known also to prepare epoxidized olefins polymers by the reaction of a polymer derived from an olefin containing 2 to 12 carbon atoms and a peracid. U.S. Pat. No. 3,382,255 discloses the epoxidation of polybutene in heptane to which is added a 40% peracetic acid solution. The temperature is held between 25°-30° C. by external cooling. Suitable and typical peracids useful in the epoxidation include performic, peracetic, perbenzoic, perphthalic and others. Performic and peracetic acids are preferred.

A polymer of isobutylene prepared in presence of a typical catalyst such as aluminum chloride is normally monofunctional, having a double bond at one end of the polymer chain. The olefin structure is predominantly the trisubstituted type (R—CR=CHR), approximately 70%, and tetrasubstituted type (R—CR=CR$_2$), approximately 20%. Small amounts of vinylidene (R—CH$_2$—CR=CH$_2$) and terminal vinyl (R—CH=CH$_2$) are present, approximately 10%. The major component of polybutenes prepared in the presence of aluminum chloride can be represented as $(CH_3)_3$—C—[CH$_2$—C(CH$_3$)$_2$—]$_n$—CR=CHCH$_3$. Some internal double bonds exist but these are not easily characterized. The olefin structure results in a compound which on epoxidation is relatively unreactive to many reagents because of steric hindrance.

Surprisingly, it has been found that epoxidized polybutenes comprising a trisubstituted epoxide structure, approximately 70%, and a tetrasubstituted epoxide structure, approximately 20%, and a 1,1-disubstituted or monosubstituted epoxide structure of approximately a content of about 10% can be reacted with a hydroxyl to form a hydroxyether in the presence of a catalyst selected from the group consisting of strongly acidic resin catalysts such as Amberlyst 15 (TM) useful for non-aqueous heterogeneous catalysis; catalysts with non-nucleophilic anions such as fluoboric acid and perchloric acid, which are not consumed through reaction with epoxide groups; and Lewis acids, for example, $ZnCl_2$, $SnCl_2$, $SnCl_4$, $TiCl_3$, $TiCl_4$, $AlCl_3$, $SbCl_5$, $BF_3\cdot(C_2H_5)_2O$, and $FeCl_3$.

It is therefore an object of this invention to provide a process for preparing a hydroxyether terminated polybutene wherein the polybutene portion has a molecular weight of from about 200 to about 20,000.

It is another object of this invention to provide a hydroxyether terminated polybutene wherein the polybutene portion has a molecular weight of from 200 to 20,000 which can be used as a component of polyesters, polyurethanes, and other compounds useful for coatings, sealants, adhesives, and other applications.

SUMMARY OF THE INVENTION

A process is disclosed for the preparation of hydroxyether terminated polybutenes from an epoxidized polybutene wherein the polybutene portion has a molecular weight of from 200 to 20,000. The hydroxyether terminated polybutene is prepared from an epoxidized polybutene composition comprising about 70% trisubstituted epoxide, 20% tetrasubstituted epoxide and about 10% 1,1-disubstituted or monosubstituted epoxide. The epoxidized polybutene is reacted with a hydroxyl compound in the presence of a catalyst. The resulting hydroxyether polybutene is useful as a chemical intermediate for modification of materials such as polyesters, acrylicsr epoxies, and polyurethanes. Such modifications can be desirable for applications such as coatings, sealants, and foams, where properties of adhesion, flexibility, and water resistance are of importance.

DETAILS OF THE INVENTION

The olefin structure of the polybutene feedstock for the instant invented process for preparation of a hydroxyether terminated polybutene comprises about 10% vinylidene or terminal double bonds, about 70% trisubstituted double bonds and about 20% tetrasubstituted double bonds. The polybutene is epoxidized by reaction with a peracid. The epoxidized polybutene is reacted with a hydroxyl compound in the presence of an acid catalyst, preferably in the presence of ferric chloride. Preferably, the epoxidized polybutene has a molecular weight within the range of from about 200 to about 20,000. More preferably, the molecular weights of epoxidized polybutenes are from about 300 to about 2300, as determined by vapor phase osmometry, and they have terminal epoxide groups which are primarily trisubstituted in nature.

Polybutenes produced in the presence of a Lewis acid such as an aluminum chloride catalyst can be considered to be mono-olefins in which the olefin or double bond structure is primarily of the trisubstituted and tetrasubstituted types. When such polybutenes are epoxidized, the resulting epoxide group is also primarily of the trisubstituted and tetrasubstituted types wherein these epoxide groups are relatively sterically hindered, especially when compared to monosubstituted epoxide groups of the well known diglycidyl ether of Bisphenol A type epoxy resins.

As a result of this steric hindrance, these epoxide groups are much less reactive than more typical, less sterically hindered epoxide groups. Also as a result of the steric environment, these epoxide groups, when forced to react by use of certain acid catalysts, tend to rearrange to ketones instead of undergoing the desired nucleophilic substitution reaction.

It is essential that a suitable catalyst be used. Without the aid of a suitable catalyst, epoxidized polybutenes do not react well with hydroxyl compounds, either at ambient temperatures or temperatures as high as 180°-200° C. Commonly used acid catalysts such as sulfuric acid and p-toluenesulfonic acid are not very effective in promoting the etherification of epoxidized polybutenes with hydroxyl groups, even at temperatures as high as 180°-200° C. However, Amberlyst 15(TM) catalyst, Rohm and Haas Company, and other resins which are strongly acidic resins useful for non-aqueous heterogeneous acid catalysis can be used in the process of this invention.

Basic catalysts such as N,N-dimethylbenzylamine and sodium carbonate are also ineffective. To the extent that base-catalyzed reactions go forward, however, base catalysis appears more effective than acid catalysis (sulfuric and p-toluenesulfonic acids) in producing the desired hydroxyether as opposed to undesired by-products. But the extent of reaction under base catalysis is low, very likely due to steric hindrance of the epoxide.

Acids such as fluoboric acid, boron trifluoride etherate, and perchloric acid are very effective in catalyzing the reaction of most or all of the epoxide of the epoxidized polybutene, but depending on reaction conditions, polybutyl ketone can be a major by-product with the hydroxyether. The ketone by-product can be produced not only from the initial epoxide reaction, but also upon subsequent degeneration of the desired hydroxyether product. Both routes to ketone production appear to be acid catalyzed. Lewis acids such as $ZnCl_2$, $SnCl_2$, $SnCl_4$, $TiCl_3$, $TiCl_4$, $AlCl_3$, $SbCl_5$, $BF_3 \cdot (C_2H_5)_2O$, and $FeCl_3$ are also effective in catalyzing the reaction of epoxidized polybutene with hydroxyl Compounds. These Lewis acids, $FeCl_3$ in particular, are able to give hydroxyether as the major product, with minimal levels of ketone.

In general, the instant invented process is as follows:

a. The molar ratio of the hydroxyl compound to epoxidized polybutene should be at least 1/1, and preferably greater than 8/1. It is believed that a relatively large excess of hydroxyl helps prevent the initial formation of ketone.

b. In cases where the epoxidized polybutene and hydroxyl compound are not mutually soluble, a suitable solvent should be used, able to dissolve both the epoxidized polybutene and the hydroxyl compound. Methylene chloride and tetrahydrofuran are examples of solvents able to dissolve the epoxidized polybutene and often able to also dissolve the hydroxyl compound.

c. Acid catalysts suitable for catalyzing the etherification reaction are those not so nucleophilic that they are consumed through reaction with the epoxide. Examples are fluoboric acid and perchloric acid. Additional suitable acid catalysts are strongly acidic resin catalysts such as Amberlyst 15 (TM), and Lewis acids such as ferric chloride. Ferric chloride is the preferred acid catalyst.

d. Catalyst levels should be between 0.2 and 15 mole percent, based on epoxidized polybutene. Preferred levels are between 0.5 and 10 percent.

e. Reaction temperatures should be between −20 and 150° C., preferably between −10 and 100° C.

f. Hydroxyl compounds suitable for this invention include mono- and polyfunctional hydroxyl compounds such as methanol, ethanol, propanol, butanol, pentanol, ethylene glycol, propylene glycol, neopentyl glycol, diethylene glycol, 1,6-hexanediol, etc. Also suitable are hydroxyl functional polymers, including acrylics and polyesters.

g. Suitable epoxidized polybutenes are those produced by epoxidiation of polybutenes polymerized with aluminum chloride catalyst. Such polybutenes have molecular weights ranging from about 300 to about 2300, and they have terminal double bonds which are primarily trisubstituted in nature. They are typically epoxidized with some type of peracid.

The following examples illustrate the process of the invention but are not to be construed as limiting the scope of the invention.

EXAMPLE I

The following is an example of formation of a hydroxyether from an epoxidized polybutene and an alcohol. An 8.3/1 molar ratio of methanol/epoxidized polybutene was added to a flask which used a thermometer, a nitrogen blanket, an agitator, and a water-cooled total condenser. Methylene chloride solvent was used. The epoxidized polybutene had a number-average molecular weight of about 365.

With the flask contents at room temperature, 2.0 mole percent fluoboric acid was added under agitation. The mixture immediately turned a darker shade of yellow and exothermed about 3° C. The mixture continued to be agitated at room temperature for a total of three hours, at which point the temperature was raised to about 40° C. and held there for one hour. Samples were taken for analysis at ten minutes, 30 minutes, 1 hour, and two hours into the room temperature reaction, and at 1 hour into the elevated temperature reaction.

Infrared analyses used to follow the reaction indicated the presence of substantial quantities of the hydroxyether and the polybutyl ketone. Most of the epoxide had reacted. $^{13}$C NMR analysis confirmed the infrared analysis.

EXAMPLE II

The following is an example of formation of a hydroxyether from an epoxidized polybutene and a diol, using ferric chloride catalyst.

Diethylene glycol, methylene chloride solvent, and ferric chloride catalyst were charged to a flask equipped with a thermometer, a nitrogen blanket, an agitator, and a water-cooled total condenser. The mixture exothermed 1° C. and turned orange upon addition of the ferric chloride. Epoxidized polybutene, average molecular weight 365, was added to the flask under agitation, at a level such that the diethylene glycol/epoxidized polybutene molar ratio was 8.3/1, and the ferric chloride catalyst was present at a 4 mole % level, based on epoxidized polybutene. After about an hour at room temperature, the mixture was heated to 50° C. and held at 50°-62° C. for about 6 hours. Samples were pulled at intervals during the reaction. Each sample was worked up with three aqueous washes to remove catalyst and unreacted diethylene glycol from the organic phase. Samples were dried over magnesium sulfate. Methylene chloride was allowed to evaporate off the remaining organic phase. Analysis by IR showed high levels of hydroxyether and low levels of epoxide and ketone. Analysis by hydroxyl number titration yielded approximately 2 hydroxyls per molecule (assuming an average molecular weight of 471). Analysis by calibrated FT infrared (FTIR) indicated that as much as 85% of the original epoxide content had reacted 5 hours into the reaction, and that the ketone comprised about 16 mole % of total functional groups or 447 micromoles per gram of final product. Hydroxyether diol concentration was about 1947 micromoles per gram of total final product or about 74 mole % of total final product.

EXAMPLE III

The following is an example of formation of a hydroxyether from an epoxidized polybutene and a triol, using ferric chloride catalyst.

Trimethylolpropane, tetrahydrofuran solvent, and ferric chloride catalyst were charged to a flask equipped with a thermometer, a nitrogen blanket, an agitator, and a water-cooled total condenser. The mixture exothermed 2° C. and turned orange upon addition of the ferric chloride. Epoxidized polybutene, average molecular weight 365, was added to the flask under agitation, at a level such that the trimethylolpropane/epoxidized polybutene molar ratio was 8.3/1, and the ferric chloride catalyst was present at an 8 mole % level, based on epoxidized polybutene. After about a hour at room temperature, the mixture was heated to 70° C. and held at 70°-75° C. for about 12 hours. Samples were pulled at intervals during the reaction. Each sample was worked up with three aqueous washes to remove catalyst and unreacted trimethylolpropane from the organic phase. Samples were dried over magnesium sulfate. Tetrahydrofuran was allowed to evaporate off the remaining organic phase. The sample pulled from the reaction mixture after 12 hours was analyzed. Analysis by hydroxyl number titration yielded approximately 2.7 hydroxyls per molecule (assuming an average molecular weight of 500). Analysis for residual iron yielded 88 ppm of iron. Analysis by calibrated FTIR indicated 2926 microequivalents of hydroxyl per gram and 396 micromoles of polybutyl ketone per gram of final product.

EXAMPLE IV

The following is an example of formation of hydroxyether from an epoxidized polybutene and a diol, using Amberlyst 15 (TM) as a catalyst. Amberlyst 15 (TM) is an ion exchange resin produced by Rohm and Haas, Philadelphia, Penna.

An 8.3/1 molar ratio of diethylene glycol to epoxidized polybutene, average molecular weight 365, was charged to a flask equipped with a thermometer, a nitrogen blanket, an agitator, and a water-cooled total condenser. Methylene chloride was used as a solvent. Amberlyst 15 catalyst was charged at a level of 36% by weight based on epoxidized polybutene. Additional charges of Amberlyst 15 at 35% levels were made both at 3 hours and 6 hours into the reaction. The mixture exothermed 2° C. upon addition of the first Amberlyst charge. The mixture was held at approximately room temperature for approximately 24 hours. Samples were pulled at intervals during the reaction. Each sample was worked up with three aqueous washes to remove unreacted diethylene glycol from the organic phase. Samples were dried over magnesium sulfate. Methylene chloride was allowed to evaporate off the remaining organic phase. Analysis by calibrated FTIR showed that most of the epoxide content reacted during the reaction. The level of ketone increased significantly, by a factor of approximately 16, during the reaction. This ketone level was much greater than with ferric chloride catalyst. Levels of the desired hydroxyether increased during the reaction, but not as much as with ferric chloride catalyst.

Analysis by FT infrared indicated 1326 micromoles of hydroxyether diol per gram of product and 654 micromoles of polybutyl ketone per gram of product and 423 micromoles of epoxide per gram of product.

EXAMPLE V

The following indicates the typical lack of reactivity of epoxidized polybutene wherein the polybutene is prepared with aluminum chloride catalyst. Attempts were made to react these epoxides, either to polymerize them in the presence of a strong acid or to react the epoxide with amines, thiol compounds or sodium hydroxide. In all cases there was either no reaction or, sometimes, a ketone was formed.

Tetraethylenepentamine (TEPA) and epoxidized polybutene of molecular weight 365 in a solution of tetrahydrofuran (THF) in the presence of water as a catalyst was refluxed overnight. There was no discernible reaction.

In a similar procedure normal dodecanethiol was refluxed overnight in THF solvent with the epoxidized polybutene. There was no reaction. The procedure was repeated in the presence of 0.10 N sodium hydroxide. Again, there was no reaction.

The reaction of TEPA with polybutene epoxide was also conducted in refluxing THF using 0.10 N sulfuric acid as a catalyst and again no reaction of the epoxide with the TEPA was observed.

What is claimed is:

1. A process of preparing hydroxyether terminated polybutenes from epoxidized polybutenes, wherein said epoxidized polybutene has been prepared from a polybutene having only one functional terminal double bond in an olefin structure about 70% trisubstituted, wherein molecular weight of polybutene portion of said epoxidized polybutene is from about 200 to about 20,000, which process comprises reacting a mono- or polyfunctional hydroxyl compound of from one to 2000 carbon atoms with said epoxidized polybutene in the presence of an acid catalyst selected from the group consisting of strongly acidic resin catalysts useful for non-aqueous heterogeneous acid catalysis, catalysts with non-nucleophilic anoins which do not react with said epoxide group, and Lewis acids selected for the group consisting of $ZnCl_2$, $SnCl_4$, $TiCl_3$, $TiCl_4$, $AlCl_3$, $SbCl_5$, and $FeCl_3$, wherein the molar ratio of said hydroxyl compound to said epoxidized polybutene is at least about 1:1 at a temperature within the range of from about $-20°$ C. to about 150° C.,, and said acid catalyst is present in an amount of from about 0.2 to about 15 mole % of said epoxidized polybutene.

2. The process of claim 1 wherein said mono- or polyfunctional hydroxyl compound of 1 to 2000 carbon atoms is selected from the group consisting of methanol, ethanol, propanol, butanol, pentanol, ethylene glycol, propylene glycol, neopentyl glycol, 1,6-hexanediol, diethylene glycol, trimethylolpropane, and hdyroxyethyl acrylate.

3. The process of claim 1 wherein said mono- or polyfunctional hydroxyl compound of 1 to 2000 carbon atoms is selected form the group of hydroxyl functional polymers comprising acrylic polymers and polyester polymers.

4. The process of claim 1 wherein said acid catalyst is selected from the group consisting of perchloric acid and ferric chloride.

5. The process of claim 1 wherein said Lewis acid catalyst is selected from the group consisting of $TiCl_4$ and ferric chloride.

6. Hydroxyethers prepared by the process of claim 1.

* * * * *

UNITED STATES PATENT OFFICE
CERTIFICATE OF CORRECTION

Patent No. 5,008,338      Dated April 16, 1991

Inventor(s) Wayne T. Riddick and Vincent F. Smith, Jr.

It is certified that error appears in the above-identified patent and that said Letters Patent is hereby corrected as shown below:

| Col. | Line | |
|---|---|---|
| 3 | 23 | "acrylicsr" should read --acrylics,-- |
| 4 | 29 | "Compounds" should read --compounds-- |
| 4 | 61 | "glycol,-" should read --glycol,-- (3rd Occur) |
| 8 | 11 | "150°C.,," should read --150°C.,-- |

Signed and Sealed this

Twenty-ninth Day of September, 1992

Attest:

DOUGLAS B. COMER

Attesting Officer      Acting Commissioner of Patents and Trademarks